United States Patent
Kim et al.

(10) Patent No.: US 10,391,750 B2
(45) Date of Patent: Aug. 27, 2019

(54) COVER WINDOW PLATE AND IMAGE DISPLAY DEVICE INCLUDING THE SAME

(71) Applicant: DONGWOO FINE-CHEM CO., LTD., Jeollabuk-do (KR)

(72) Inventors: Jin Ho Kim, Seoul (KR); Hyuk Hwan Kwon, Gyeonggi-do (KR); Dong Jin Lee, Gyeonggi-do (KR)

(73) Assignee: DONGWOO FINE-CHEM CO., LTD., Jeollabuk-do (KR)

( * ) Notice: Subject to any disclaimer, the term of this patent is extended or adjusted under 35 U.S.C. 154(b) by 0 days.

(21) Appl. No.: 15/757,071

(22) PCT Filed: Aug. 23, 2016

(86) PCT No.: PCT/KR2016/009308
§ 371 (c)(1),
(2) Date: Mar. 2, 2018

(87) PCT Pub. No.: WO2017/039209
PCT Pub. Date: Mar. 9, 2017

(65) Prior Publication Data
US 2018/0178494 A1   Jun. 28, 2018

(30) Foreign Application Priority Data

Sep. 3, 2015 (KR) .......... 10-2015-0124916
Sep. 3, 2015 (KR) .......... 10-2015-0124917

(51) Int. Cl.
*B32B 3/00* (2006.01)
*B32B 27/08* (2006.01)
(Continued)

(52) U.S. Cl.
CPC ............... *B32B 27/08* (2013.01); *B32B 7/02* (2013.01); *B32B 27/14* (2013.01); *B32B 27/28* (2013.01);
(Continued)

(58) Field of Classification Search
CPC .... B32B 7/02; B32B 7/27; B32B 7/08; B32B 7/14; B32B 7/28; G02B 1/14; G09F 9/00; G09F 9/30
See application file for complete search history.

(56) References Cited

U.S. PATENT DOCUMENTS

2015/0017393 A1   1/2015 Oh et al.
2016/0014881 A1*  1/2016 Shin ................ G06F 1/1652
                                                361/749

FOREIGN PATENT DOCUMENTS

CN   101046520 A   10/2007
CN   102268201 A   12/2011
(Continued)

OTHER PUBLICATIONS

International Search Report for PCT/KR2016/009308.

*Primary Examiner* — Elizabeth E Mulvaney
(74) *Attorney, Agent, or Firm* — The PL Law Group, PLLC (57) ABSTRACT

A cover window plate includes an organic-inorganic hybrid hard coating layer on at least one surface of a polymer substrate film, wherein the plate has a pencil hardness of 4H or more under a load of 1 kg, such that an occurrence of deflection in the plate under severe conditions such as high temperature and high humidity atmospheres may be significantly reduced, thus to achieve excellent durability and optical characteristics when applying to products, as well as excellent anti-fingerprint properties of a surface, and an image display device including the cover window plate.

30 Claims, 2 Drawing Sheets

(51) Int. Cl.
  *C08L 101/00* (2006.01)
  *G09F 9/00* (2006.01)
  *G09F 9/30* (2006.01)
  *G02B 1/14* (2015.01)
  *B32B 7/02* (2019.01)
  *B32B 27/14* (2006.01)
  *B32B 27/28* (2006.01)
  *C08J 7/04* (2006.01)
  *C09D 133/08* (2006.01)

(52) U.S. Cl.
  CPC ............ *C08J 7/047* (2013.01); *C08L 101/00* (2013.01); *C09D 133/08* (2013.01); *G02B 1/14* (2015.01); *G09F 9/00* (2013.01); *G09F 9/30* (2013.01)

(56) References Cited

FOREIGN PATENT DOCUMENTS

| | | |
|---|---|---|
| CN | 102806736 A | 12/2012 |
| CN | 103192558 A | 7/2013 |
| CN | 104024295 A | 9/2014 |
| CN | 104115238 A | 10/2014 |
| CN | 104339734 A | 2/2015 |
| JP | 2015-508345 A | 3/2015 |
| KR | 10-2013-0074167 A | 7/2013 |
| KR | 10-2013-0081576 A | 7/2013 |
| KR | 10-2013-0117464 A | 10/2013 |
| KR | 10-2014-0076779 A | 6/2014 |
| KR | 10-2015-0006932 A | 1/2015 |
| TW | 201422730 A | 6/2014 |

\* cited by examiner

COVER WINDOW PLATE AND IMAGE DISPLAY DEVICE INCLUDING THE SAME

CROSS REFERENCE TO RELATED APPLICATIONS AND CLAIM OF PRIORITY

This application claims benefit under 35 U.S.C. 119(e), 120, 121, or 365(c), and is a National Stage entry from International Application No. PCT/KR2016/009308, filed Aug. 23, 2016, which claims priority to the benefit of Korean Patent Application No. 10-2015-0124916 filed on Sep. 3, 2015 and 10-2015-0124917 filed on Sep. 3, 2015 in the Korean Intellectual Property Office, the entire contents of which are incorporated herein by reference.

1. TECHNICAL FIELD

The present invention relates to a cover window plate and an image display device including the same, and more particularly, to a cover window plate which minimizes an occurrence of deflection in the plate under high temperature and high humidity conditions.

2. DESCRIPTION OF THE RELATED ART

Recently, various display devices include a window cover for protecting a display on a display panel to protect the display panel from a scratch or external impact, and use strengthened glass for a display as the window cover in most cases. The strengthened glass for a display is thinner than normal glass, but has characteristics of having a high strength and being strongly manufactured to resist scratches.

However, the strengthened glass has a disadvantage of not being suitable for weight reduction of a portable device due to a heavy weight, as well as causes a difficulty in achieving unbreakable properties due to being vulnerable to the external impact, and is not capable of being bent exceeding a predetermined level, hence not being preferably applied to a material of a flexible display having bendable and foldable functions.

In recent years, discussions about an optical plastic cover capable of achieving flexibility and impact resistance and having a strength or scratch resistance corresponding to the strengthened glass have been proceeded in various ways. Generally, as a material of an optical transparent plastic cover having flexibility compared to the strengthened glass, there are polyethylene terephthalate (PET), polyether sulfone (PES), polyethylene naphthalate (PEN), polyacrylate (PAR), polycarbonate (PC), polyimide (PI), polyaramid (PA), and the like. However, such polymer plastic plates exhibit a lack of properties in aspects of hardness and scratch resistance compared to the strengthened glass used as the window cover for protecting a display, as well as have insufficient impact resistance. Thereby, various attempts for compensating required properties by coating these plastic plates with a composite resin composition have been proceeded.

In a case of a normal hard coating, a composition including a resin containing a photo-curable functional group such as (meth)acrylate or epoxy, etc., curing agent, curing catalyst, and other additives is used. In particular, a composite resin having a high number of functional groups may be used as the window cover for protecting a display, which has improved hardness and scratch resistance by coating an optical plastic substrate film with the composite resin.

However, in the case of the photo-curable composite resin having a high number of functional groups such as (meth) acrylate or epoxy, it is difficult to achieve a high hardness corresponding to the strengthened glass, as well as, a curling phenomenon may significantly occur due to a contraction during curing, and it has a disadvantage of not being suitable for a protective window plate to be applied to the flexible display due to a lack of flexibility.

Korean Patent Laid-Open Publication No. 2013-74167 discloses a plastic plate, however, still has lack of improvement in a hardness thereof and prevention an occurrence of deflection in the plate.

SUMMARY

Accordingly, it is an object of the present invention to provide a cover window plate capable of achieving a high hardness while being manufactured as a non-glass product.

In addition, another object of the present invention is to provide a cover window plate which minimize an occurrence of deflection in the plate under severe conditions such as high temperature and high humidity atmospheres.

Further, another object of the present invention is to provide an image display device including the cover window plate.

The above objects of the present invention will be achieved by the following characteristics:

(1) A cover window plate including: an organic-inorganic hybrid hard coating layer on at least one surface of a polymer substrate film, wherein the plate has a pencil hardness of 4H or more under a load of 1 kg.

(2) The cover window plate according to the above (1), wherein the pencil hardness is 6H or more under a load of 1 kg.

(3) The cover window plate according to the above (1), wherein the hard coating layer includes at least one inorganic compound selected from a group consisting of nano-silica, vinyltrimethoxysilane, vinyltriethoxysilane, glycidoxypropylmethyldimethoxysilane, epoxycyclohexylethyltrimethoxysilane, glycidoxypropyltrimethoxysilane, glycidoxypropyltriethoxysilane, methacryloxypropyltrimethoxysilane, methacryloxypropyltriethoxysilane.

(4) The cover window plate according to the above (3), wherein the hard coating layer is made of a composition for forming a hard coating layer which further includes a polymerizable compound, a polymerization initiator, and a solvent other than the inorganic compound.

(5) The cover window plate according to the above (3), wherein the inorganic compound is included in an amount of 100 to 260 parts by weight to 100 parts by weight of the polymerizable compound.

(6) The cover window plate according to the above (3), wherein the polymerizable compound is at least one selected from a group consisting of perfluoroalkyl acrylate, hydroxyethyl (meth)acrylate, hexanediol diacrylate, trimethylolpropane tri(meth)acrylate, pentaerythritol tri(meth)acrylate, ethyleneglycol di(meth)acrylate, 1,6-hexanediol di(meth) acrylate, tripropyleneglycol diacrylate, trimethylolpropane trioxyethyl (meth)acrylate, tricyclodecane dimethanol diacrylate, and dipentaerythritol hexa(meth)acrylate.

(7) The cover window plate according to the above (1), wherein the hard coating layer has a water contact angle of 80° to 120°.

(8) The cover window plate according to the above (1), wherein the hard coating layer has a thickness of 10 to 40 µm.

(9) The cover window plate according to the above (1), wherein the polymer substrate film is heat treated under a condition of a heat distortion temperature (HDT)±20° C. or a glass transition temperature (Tg)±20° C. of a polymer.

(10) The cover window plate according to the above (1), wherein the polymer substrate film is heat treated at 90° C. to 110° C. for 120 minutes to 240 minutes.

(11) The cover window plate according to the above (10), wherein the polymer substrate film is cooled at 25° C. to 60° C. for 1 minute to 15 minutes after heat treating.

(12) The cover window plate according to the above (11), wherein the polymer substrate film is further cooled at a lower temperature than the temperature of the cooling process after cooling.

(13) The cover window plate according to the above (1), wherein the polymer substrate film includes at least one selected from a group consisting of polymethyl (meth) acrylate (PMMA), polycarbonate (PC), polyethylene terephthalate (PET), polyimide (PI), polyamide (PA), cycloolefin polymer (COP), cycloolefin copolymer (COC), PMMA/PC copolymer, and PMMA/PC/PMMA copolymer.

(14) The cover window plate according to the above (1), wherein the polymer substrate film has a thickness of 0.2 to 1.0 mm.

(15) The cover window plate according to the above (1), further including a non-display part shielding layer on a surface of the polymer substrate film opposite to the surface on which the hard coating layer is formed.

(16) The cover window plate according to the above (15), further including protective films respectively formed on both surfaces thereof.

(17) The cover window plate according to the above (16), wherein the protective film on a front surface has a contraction rate of 100 ppm or less, and the protective film on a rear surface has a contraction rate of 100 ppm or more under a condition of 60° C. and 90% RH.

(18) The cover window plate according to the above (16), wherein the protective film on a front surface has a contraction rate of 100 ppm or less, and the protective film on a rear surface has a contraction rate of 100 ppm or more under a condition of 85° C. and 85% RH.

(19) The cover window plate according to the above (1), wherein the plate has a deflected amount of −1.0 mm (reverse curls) to +1.0 mm (normal curls), which is measured at room temperature (25° C.) with being placed so that the hard coating layer faces a top, after leaving the plate at 60° C. and 90% RH.

(20) The cover window plate according to the above (1), wherein the plate has a deflected amount of −1.0 mm (reverse curls) to +1.0 mm (normal curls), which is measured at room temperature (25° C.) with being placed so that the hard coating layer faces a top, after leaving the plate at 85° C. and 85% RH.

(21) The cover window plate according to the above (1), including a curved part at at least one end portion thereof.

(22) The cover window plate according to the above (21), wherein the curved part has a radius of curvature of 5 mm to 15 mm.

(23) An image display device including the cover window plate according to any one of the above (1) to (22).

(24) A method of manufacturing a cover window plate, including: a step S1 of forming an organic-inorganic hybrid hard coating layer by applying a composition for forming an organic-inorganic hybrid coating layer including an inorganic compound to at least one surface of a polymer substrate film.

(25) The method according to the above (24), further including: a step of heat treating the polymer substrate film under a condition of a heat distortion temperature (HDT) ±20° C. or a glass transition temperature (Tg)±20° C. of a polymer, before the step S1.

(26) The method according to the above (24), wherein the polymer substrate film is subjected to a heat treatment step S1-1 at 90° C. to 110° C. for 120 minutes to 240 minutes.

(27) The method according to the above (26), wherein the polymer substrate film is subjected to a step S1-2 of cooling the film at 25° C. to 60° C. for 1 minute to 15 minutes after the heat treatment step S1-1.

(28) The method according to the above (27), wherein the polymer substrate film is further subjected to a step S1-3 of cooling the film at a lower temperature than the cooling temperature of the step S1-2 after the step S1-2.

(29) The method according to the above (24), further including: a step S2 of forming a curved part by heat treating a portion separated from at least one end portion of the substrate film at a predetermined interval while applying a pressure to the end portion so as to be bent in a direction in which the end portion is pressed, after forming the organic-inorganic hybrid hard coating layer.

(30) The method according to the above (29), wherein the heat treatment of the step S2 is executed by hot air jetting.

(31) The method according to the above (29), wherein the heat treatment of the step S2 is executed at 100° C. to 350° C.

(32) The method according to the above (29), wherein the step S2 is performed by an apparatus which includes: a curvature forming unit disposed on a surface of the substrate film opposite to the surface at a point to which the hot air is jetted to support the cover window plate; a pressing unit disposed on one surface of the end portion of the substrate film to press the same; and a fixing unit disposed on a side of substrate film opposite to the end portion based on the point to which the hot air is jetted to fix the other end portion of the substrate film.

The cover window plate of the present invention is suitable for achieving weight reduction of products since a high hardness may be achieved while being manufactured as a non-glass product and has very excellent economic advantages due to low manufacturing costs.

In addition, the cover window plate of the present invention may significantly reduce an occurrence of deflection in the plate under severe conditions such as high temperature and high humidity atmospheres, thus to achieve excellent durability and optical characteristics when applying to products.

Further, the cover window plate of the present invention has excellent anti-fingerprint properties of a surface even if it is not provided with a separate anti-fingerprint layer.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

The present invention discloses a cover window plate including an organic-inorganic hybrid hard coating layer on at least one surface of a polymer substrate film, wherein the plate has a pencil hardness of 4H or more under a load of 1 kg, such that an occurrence of deflection in the plate under severe conditions such as high temperature and high humidity atmospheres may be significantly reduced, thus to achieve excellent durability and optical characteristics when applying to products, as well as excellent anti-fingerprint properties of a surface, and an image display device including the cover window plate.

Hereinafter, the present invention will be described in detail.

When manufacturing a cover window plate on the basis of a polymer substrate film, it is preferable to form a hard coating layer on a surface of the substrate film in an aspect of improving a hardness. However, by a contraction rate inherent to a polymer included in the substrate film and a stress remained in the substrate film due to a thermal variation during manufacturing the same, a deflection phenomenon, in which each layer is peeled-off under severe conditions such as high temperature and high humidity atmospheres, may occur, as well as durability of products may be decreased due to such the occurred deflection, and visibility of an image to be displayed may be deteriorated.

To solve above-described problems, the cover window plate of the present invention includes an organic-inorganic hybrid hard coating layer having a specific hardness value formed on a surface of the polymer substrate film, such that the deflection phenomenon under high temperature and high humidity conditions has been significantly reduced. In addition, anti-fingerprint properties of a surface may be achieved by the hard coating layer.

A cover window plate 10 according to the present invention includes a polymer substrate film, and an organic-inorganic hybrid hard coating layer.

The organic-inorganic hybrid hard coating layer is formed on at least one surface of the polymer substrate film, such that the plate may exhibit a pencil hardness of 4H or more on a surface thereof under a load of 1 kg.

The present inventor found that a pencil hardness suitable for the cover window plate is 4H or more under a load of 1 kg, and the present invention has been completed on the basis of the finding. A plate on the basis of the conventional polymer substrate film does not satisfy the pencil hardness of 4H or more under the above-described condition.

The cover window plate according to the present invention includes the organic-inorganic hybrid hard coating layer, thereby a plate having a pencil hardness of 4H or more under a load of 1 kg may be achieved.

In the present invention, the pencil hardness under a load of 1 kg is a property represented by an entire surface of the plate.

If the pencil hardness of the plate is less than 4H, it is not possible to exhibit a sufficient hardness as the cover window plate, and if the pencil hardness thereof under a load of 1 kg, the above-described effects may be further improved.

The organic-inorganic hybrid hard coating layer according to the present invention is made of a combination of an organic compound and an inorganic compound. In this case, the pencil hardness of the hard coating layer may be achieved by controlling types of the used organic and inorganic compounds, a mixing ratio thereof, process conditions during forming the coating layer, and the like.

The organic-inorganic hybrid hard coating layer may be formed by applying a composition for forming a hybrid coating layer which further includes a polymerizable compound, a polymerization initiator, and a solvent other than the inorganic compound to the polymer substrate film.

Types of the inorganic compound useable in the present invention are not particularly limited but may include, for example, nano-silica, vinyltrimethoxysilane, vinyltriethoxysilane, glycidoxypropylmethyldimethoxysilane, epoxycyclohexylethyltrimethoxysilane, glycidoxypropyltrimethoxysilane, glycidoxypropyltriethoxysilane, methacryloxypropyltrimethoxysilane, methacryloxypropyltriethoxysilane, and the like. In particular, vinyltrimethoxysilane, vinyltriethoxysilane, methacryloxypropyltrimethoxysilane, methacryloxypropyltriethoxysilane is preferably used, and these compounds may be used alone or in combination of two or more thereof.

A content of the inorganic compound is not particularly limited but may be included, for example, in an amount of 100 to 260 parts by weight ('wt. parts') to 100 wt. parts of the polymerizable compound. When the inorganic compound is included in the above content range, the organic compound and the inorganic compound are mixed in a proper ratio. Thereby, compressibility of an entire structure may be improved, and a reduction in a thickness of the coating layer may be obtained, as well as, adhesion with the polymer substrate film may be improved, and surface smoothness and high hardness of the coating layer may be achieved. As a result, it is determined that the deflection phenomenon under high temperature and high humidity conditions may be minimized, excellent durability may be achieved during forming a curved part, and anti-fingerprint properties of a surface may be improved.

In addition, it is preferable that the inorganic compound is included in an amount of 120 to 260 wt. parts. In this case, effects of enhancing the hardness may be further improved.

Types of the polymerizable compound useable in the present invention are not particularly limited, but may be polymerized by including an acrylate monomer, and in particular, may include perfluoroalkyl acrylate, hydroxyethyl (meth)acrylate, hexanediol diacrylate, trimethylolpropane tri(meth)acrylate, pentaerythritol tri(meth)acrylate, ethyleneglycol di(meth)acrylate, 1,6-hexanediol di(meth)acrylate, tripropyleneglycol diacrylate, trimethylolpropane trioxyethyl (meth)acrylate, tricyclodecane dimethanol diacrylate, dipentaerythritol hexa(meth)acrylate, and the like. These compounds may be used alone or in combination of two or more thereof.

In addition, it is preferable that the polymerizable compound uses a fluorine binder resin in an aspect of improving the anti-fingerprint properties. A resin polymerized by including perfluoroalkyl acrylate, etc. may be more preferably used.

Types of the polymerization initiator useable in the present invention are not particularly limited but may use, for example, at least one compound selected from a group consisting of acetophenone compounds, benzophenone compounds, triazine compounds, biimidazole compounds, thioxythanton compounds and oxime ester compounds. The oxime ester compounds are preferably used.

Particular examples of the acetophenone compound may include diethoxyacetophenone, 2-hydroxy-2-methyl-1-phenylpropan-1-one, benzyldimethylketal, 2-hydroxy-1-[4-(2-hydroxyethoxy)phenyl]-2-methylpropan-1-one, 1-hydroxy-cyclohexylphenylketone, 2-methyl-1-(4-methylthiophenyl)-2-morpholinopropan-1-one, 2-benzyl-2-dimethylamino-1-(4-morpholinophenyl)butan-1-one, 2-hydroxy-2-methyl-1-

[4-(1-methylvinyl)phenyl]propan-1-one, 2-(4-methylbenzyl)-2-(dimethylamino)-1-(4-morpholinophenyl)butan-1-one, and the like.

Particular examples of the benzophenone compound may include benzophenone, o-benzoyl methyl benzoate, 4-phenylbenzophenone, 4-benzoyl-4'-methyldiphenyl sulfide, 3,3',4,4'-tetra(tert-butylperoxycarbonyl)benzophenone, 2,4,6-trimethylbenzophenone, and the like.

Particular examples of the triazine compound may include 2,4-bis(trichloromethyl)-6-(4-methoxyphenyl)-1,3,5-triazine, 2,4-bis(trichloromethyl)-6-(4-methoxynaphthyl)-1,3,5-triazine, 2,4-bis(trichloromethyl)-6-piperonyl-1,3,5-triazine, 2,4-bis(trichloromethyl)-6-(4-methoxystyryl)-1,3,5-triazine, 2,4-bis(trichloromethyl)-6-[2-(5-methylfuran-2-yl)ethenyl]-1,3,5-triazine, 2,4-bis(trichloromethyl)-6-[2-(furan-2-yl)ethenyl]-1,3,5-triazine, 2,4-bis(trichloromethyl)-6-[2-(4-diethylamino-2-methylphenyl)ethenyl]-1,3,5-triazine, 2,4-bis(trichloromethyl)-6-[2-(3,4-dimethoxyphenyl)ethenyl]-1,3,5-triazine, and the like.

Particular examples of the biimidazole compound may include 2,2'-bis(2-chlorophenyl)-4,4',5,5'-tetraphenylbiimidazole, 2,2'-bis(2,3-dichlorophenyl)-4,4',5,5'-tetraphenylbiimidazole, 2,2'-bis(2-chlorophenyl)-4,4',5,5'-tetra(alkoxyphenyl)biimidazole, 2,2'-bis(2-chlorophenyl)-4,4',5,5'-tetra(trialkoxyphenyl)bimidazole, 2,2-bis(2,6-dichlorophenyl)-4,4',5,5'-tetraphenyl-1,2'-biimidazole, or an imidazole compound having a phenyl group at 4,4',5,5' position substituted by a carboalkoxy group, and the like. Among these, 2,2'-bis(2-chlorophenyl)-4,4',5,5'-tetraphenylbiimidazole, 2,2'-bis(2,3-dichlorophenyl)-4,4',5,5'-tetraphenylbiimidazole, 2,2-bis(2,6-dichlorophenyl)-4,4',5,5'-tetraphenyl-1,2'-biimidazole, and the like are preferably used.

Particular examples of the thioxanthone compound may include 2-isopropylthioxanthone, 2,4-diethylthioxanthone, 2,4-dichlorothioxanthone, 1-chloro-4-propoxythioxanthone, and the like.

Particular examples of the oxime ester compound may include o-ethoxycarbonyl-α-oxyimino-1-phenylpropan-1-one, 1,2-octanedione, 1-(4-phenylthio)phenyl-2-(o-benzoyloxime), ethanone, 1-(9-Ethyl)-6-(2-methylbenzoyl-3-yl), 1-(o-acetyloxime), and the like. Commercially available products of the oxime ester compound may include CGI-124 (Ciba-Geigy Co.), CGI-224 (Ciba-Geigy Co.), Irgacure OXE-01 (BASF Co.), Irgacure OXE-02 (BASF Co.), N-1919 (Adeka Co.), NCI-831 (Adeka Co.), and the like.

In addition, the polymerization initiator may further include a polymerization initiation enhancer in order to improve the sensitivity of the hard coating layer of the present invention. Since the hard coating layer according to the present invention includes the polymerization initiation enhancer, the sensitivity may be further increased, thus improving productivity.

Particular examples of the solvent useable in the present invention are not particularly limited but may include, for example, ethyleneglycol monoalkylethers such as ethyleneglycol monomethylether, ethyleneglycol monoethylether, ethyleneglycol monopropylether, ethyleneglycol monobutylether, etc.; diethyleneglycol dialkylethers such as diethyleneglycol dimethylether, diethyleneglycol diethylether, diethyleneglycol ethylmethylether, diethyleneglycol dipropylether, diethyleneglycol butylether, etc.; ethyleneglycol alkylether acetates such as methylcellosolve acetate, ethylcellosolve acetate, ethyleneglycol monobutylether acetate, ethyleneglycol monoethylether acetate, etc.; alkyleneglycol alkylether acetates such as propyleneglycol monomethylether acetate, propyleneglycol monoethylether acetate, propyleneglycol monopropylether acetate, methoxybutyl acetate, methoxypentyl acetate, etc.; propyleneglycol monoalkylethers such as propyleneglycol monomethylether, propyleneglycol monoethylether, propyleneglycol monopropylether, propyleneglycol monobutylether, etc.; propyleneglycol dialkylethers such as propyleneglycol dimethylether, propyleneglycol diethylether, propyleneglycol ethylmethylether, propyleneglycol dipropylether, propyleneglycol propylmethylether, propyleneglycol ethylpropylether, etc.; propyleneglycol alkylether propionates such as propyleneglycol methylether propionate, propyleneglycol ethylether propionate, propyleneglycol propylether propionate, propyleneglycol butylether propionate, etc.; butyldiol monoalkylethers such as methoxybutylalcohol, ethoxybutylalcohol, propoxybutylalcohol, butoxybutylalcohol, etc.; butandiol monoalkylether acetates such as methoxybutyl acetate, ethoxybutyl acetate, propoxybutyl acetate, butoxybutyl acetate, etc.; butandiol monoalkylether propionates such as methoxybutyl propionate, ethoxybutyl propionate, propoxybutyl propionate, butoxybutyl propionate, etc.; dipropyleneglycol dialkylethers such as dipropyleneglycol dimethylether, dipropyleneglycol dietherether, dipropyleneglycol methylethylether, etc.; aromatic hydrocarbons such as benzene, toluene, xylene, mesithylene, etc.; ketones such as methylethylketone, acetone, methylamylketone, methylisobutylketone, cyclohexanone, etc.; alcohols such as ethanol, propanol, butanol, hexanol, cyclohexanol, ethyleneglycol, glycerin, etc.; esters such as methyl acetate, ethyl acetate, propyl acetate, butyl acetate, 2-hydroxyethyl propionate, 2-hydroxy-2-methylmethyl propionate, 2-hydroxy-2-methylethyl propionate, hydroxymethyl acetate, hydroxyethyl acetate, hydroxybutyl acetate, methyl lactate, ethyl lactate, propyl lactate, butyl lactate, 3-hydroxymethyl propionate, 3-hydroxyethyl propionate, 3-hydroxypropyl propionate, 3-hydroxybutyl propionate, 2-hydroxy-3-methylmethyl butanate, methoxymethyl acetate, methoxyethyl acetate, methoxypropyl acetate, methoxybutyl acetate, ethoxymethyl acetate, ethoxyethyl acetate, ethoxypropyl acetate, ethoxybutyl acetate, propoxymethyl acetate, propoxyethyl acetate, propoxypropyl acetate, propoxybutyl acetate, butoxymethyl acetate, butoxyethyl acetate, butoxypropyl acetate, butoxybutyl acetate, 2-methoxymethyl propionate, 2-methoxyethyl propionate, 2-methoxypropyl propionate, 2-methoxybutyl propionate, 2-ethoxymethyl propionate, 2-ethoxyethyl propionate, 2-ethoxypropyl propionate, 2-ethoxybutyl propionate, 2-butoxymethyl propionate, 2-butoxyethyl propionate, 2-butoxypropyl propionate, 2-butoxybutyl propionate, 3-methoxymethyl propionate, 3-methoxyethyl propionate, 3-methoxypropyl propionate, 3-methoxybutyl propionate, 3-ethoxymethyl propionate, 3-etoxyethyl propionate, 3-ethoxypropyl propionate, 3-ethoxybutyl propionate, 3-propoxymethyl propionate, 3-propoxyethyl propionate, 3-propoxypropyl propionate, 3-propoxybutyl propionate, 3-butoxymethyl propionate, 3-butoxyethyl propionate, 3-butoxypropyl propionate, 3-butoxybutyl propionate, etc.; cyclic ethers such as tetrahydrofuran, pyran, etc.; cyclic esters such as γ-butyrolactone, and the like. The above exemplified compounds may be used alone or in combination with at least two or more thereof.

In consideration of application and drying properties, the solvent used herein may be esters including, for example, alkyleneglycol alkylether acetates, ketones, butandiol alkylether acetates, butandiol monoalkylethers, 3-ethoxyethyl propionates, 3-methoxymethyl propionates, and the like. More preferably, propyleneglycol monomethylether acetate, propyleneglycol monoethylether acetate, cyclohexanone, methoxybutyl acetate, methoxybutanol, 3-ethoxyethyl propionate, 3-methoxymethyl propionate, etc. may be used.

The organic-inorganic hybrid hard coating layer according to the present invention may have a water contact angle of 80° to 120°, and preferably, 100° to 120°. Within the above water contact angle range, anti-fingerprint properties of the surface may be improved, thus to further increase visibility of an image to be displayed.

A thickness of the organic-inorganic hybrid hard coating layer according to the present invention is not particularly limited but may be, for example, 10 to 40 μm, and preferably, 15 to 30 μm. When the hybrid coating layer has a thickness satisfying the above range, effects of improving the pencil hardness may be achieved.

The polymer substrate film according to the present invention serves as a substrate on which the organic-inorganic hybrid hard coating layer is formed, and types thereof are not particularly limited so long as it has a proper strength so as to facilitate forming of the hard coating layer.

Particular examples of the polymer substrate film useable in the present invention may include polymethyl (meth) acrylate (PMMA), polycarbonate (PC), polyethylene terephthalate (PET), polyimide (PI), polyamide (PA), cycloolefin polymer (COP), cycloolefin copolymer (COC), PMMA/PC copolymer, PMMA/PC/PMMA copolymer, and the like. The polymethyl (meth)acrylate (PMMA) is preferably used.

A thickness of the polymer substrate film according to the present invention is not particularly limited but may be, for example, 0.2 to 1.0 mm. Within the above thickness range, effects of satisfying a high hardness of 4H or more may be achieved.

The cover window plate according to the present invention may further include a non-display part shielding layer on a surface of the polymer substrate film opposite to the surface on which the hybrid coating layer is formed.

In the present invention, "a front (surface)" means a visible side of the image display device, and "a rear (surface)" means a side opposite to the visible side based on the corresponding member.

The non-display part shielding layer according to the present invention serves to conceal a portion to be shielded in the image display device, and visually beautify an appearance. Materials and shapes of the non-display part shielding layer are not particularly limited but may include, for example, stereoscopic patterns capable of implementing a stereoscopic structure due to being formed in a concavo-convex structure. Particular examples thereof may include patterns such as an IR sensor, a camera opening part, a home key hole, a speaker hole, icons, and the like.

The non-display part shielding layer may include a coloring agent, an alkaline soluble resin, a polymerizable compound, a polymerization initiator, a solvent, etc., and may be made of a composition for forming a non-display part shielding layer. Individual ingredients in the composition may include any material generally used in the related art without particular limitation thereof.

The coloring agent may use any coloring agent known in the related art without particular limitation thereof. Types of the coloring agent are not particularly limited so long as it can express colors required by a user, and may include, for example, white, red, green, blue dyes and pigments; yellow, orange, violet, brown dyes and pigments for a combination of colors; carbon black, or the like, which may be used alone or in combination of two or more thereof.

The coloring agent may further include metal powders, white pigments, fluorescent pigments, etc., as necessary.

The pigment may be an inorganic pigment or organic pigment.

Types of the inorganic pigment are not particularly limited but may include, for example, barium sulfate, lead sulfate, titanium oxide, yellow lead, Bengal lead, chromium oxide, carbon black, and the like.

Types of the organic pigment are not particularly limited but may include, for example, various pigments which have color index (C.I.) numbers and are generally used in the related art, which may be used alone or in combination of two or more thereof.

The cover window plate according to the present invention may further include protective films on both surfaces thereof for preventing a poor appearance such as surface scratches occurred during delivery of plates after manufacturing, and the protective films may be removed when the plate is applied to final products.

The protective films according to the present invention may be formed on both surfaces of the plate. That is, the protective films may be disposed on a front of the polymer substrate film provided with the hard coating layer, and on a rear of the non-display part shielding layer, respectively.

The protective film according to the present invention is not particularly limited so long as it has excellent properties such as transparency, mechanical strength, thermal stability, moisture-shielding properties, isotropic properties, or the like. Conventional films, for example, polyester films such as polyethylene terephthalate, polyethylene isophthalate, polybutylene terephthalate, etc.; cellulose films such as diacetylocellulose, triacetylcellulose, etc.; polycarbonate films; acryl films such as polymethyl (meth)acrylate, polyethyl (meth)acrylate, etc.; styrene films such as polystyrene, acrylonitrile-styrene copolymer, etc.; a polyolefin resin such as polyethylene, polypropylene, a polyolefin having a cyclo- or norbonene structure, ethylene-propylene copolymer, etc.; polyimide films; polyethersulfone films; sulfone films, or the like, may be used, but it is not particularly limited thereto.

In the present invention, the protective film on a front surface (the protective film on the front of the polymer substrate film) has a contraction rate of 100 ppm or less under a condition of 60° C. and 90% RH, and the protective film on a rear surface (the protective films on the rear of the non-display part shielding layer) has a contraction rate of 100 ppm or more under a condition of 60° C. and 90% RH. The condition of 60° C. and 90% RH means that the plate is stable under high temperature and high humidity atmospheres, and within the above contraction rate in this condition, an occurrence of deflection in the plate may be minimized.

Further, in the present invention, the protective film on the front surface (the protective film on the front of the polymer substrate film) has a contraction rate of 100 ppm or less under a condition of 85° C. and 85% RH, and the protective film on the rear surface (the protective films on the rear of the non-display part shielding layer) has a contraction rate of 100 ppm or more under a condition of 85° C. and 85% RH. The condition of 85° C. and 85% RH means that stability of the plate is evaluated under severer condition than the condition of 60° C. and 90% RH, and within the above contraction rate in this condition, an occurrence of deflection in the plate may be minimized.

In addition, the protective film on the front surface may have a peeling-off strength of 10 to 100 N/25 mm, and the protective film on the rear surface may have a peeling-off strength of 100 to 300 N/25 mm. In this case, an occurrence of deflection in the plate may be minimized.

The cover window plate according to the present invention having the above-described configuration may significantly reduce an occurrence of deflection under high temperature and high humidity conditions. For example, the cover window plate may have a deflected amount of −1.0 mm (reverse curls) to +1.0 mm (normal curls), and preferably, −0.5 to +0.5 mm, which is measured at room temperature (25° C.) with being placed so that the hard coating layer faces a top, after leaving the plate at 60° C. and 90% RH.

In addition, the cover window plate may have a deflected amount of −1.0 mm (reverse curls) to +1.0 mm (normal curls), and preferably, −0.5 to +0.5 mm, which is measured at room temperature (25° C.) with being placed so that the hard coating layer faces a top, after leaving the plate at 85° C. and 85% RH.

Figure 1:
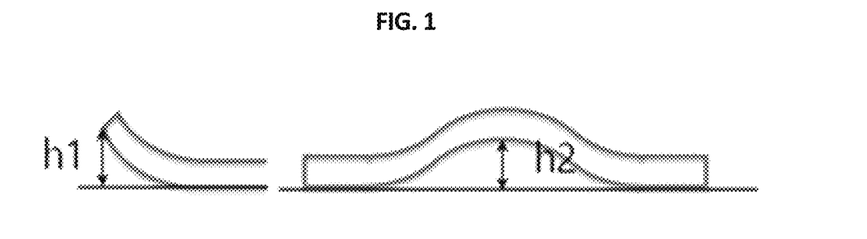
FIG. 1 is a view illustrating a reference for measuring an occurrence of deflection in the present invention.

In the present invention, the "occurrence of deflection" means a case in which lifting up h1 occurs at an end of the plate or peeling-off h2 occurs inside of the plate under high temperature and high humidity conditions, and the "deflected amount" means a maximum height among portions that are not adhered to a bottom surface and lifted up therefrom, when the cover window plate is placed on a flat bottom surface at room temperature (25° C.) after introducing the plate under high temperature and high humidity conditions (see FIG. 1)

More particularly, the deflected amount is represented by measuring the height of the plate with being placed so that the hard coating layer faces the top. A case of plus (+) deflected amount means that the plate is bent toward the hard coating layer (normal curls), and a case of minus (−) deflected amount means that the plate is bent toward the non-display part shielding layer (reverse curls).

If necessary, the cover window plate of the present invention may include a curved part at at least one end portion thereof.

In the present invention, since the pencil hardness under a load of 1 kg is a property represented by the entire surface of the plate, when the cover window plate includes the curved part at at least one end portion thereof, the pencil hardness is a property represented by both of the curved part and flat portions in which the curved part is not formed of the plate.

The curved part according to the present invention is formed at at least one end portion of the plate while having a predetermined radius of curvature, such that the cover window plate of the present invention may be applied to products having different shapes.

Figure 2:
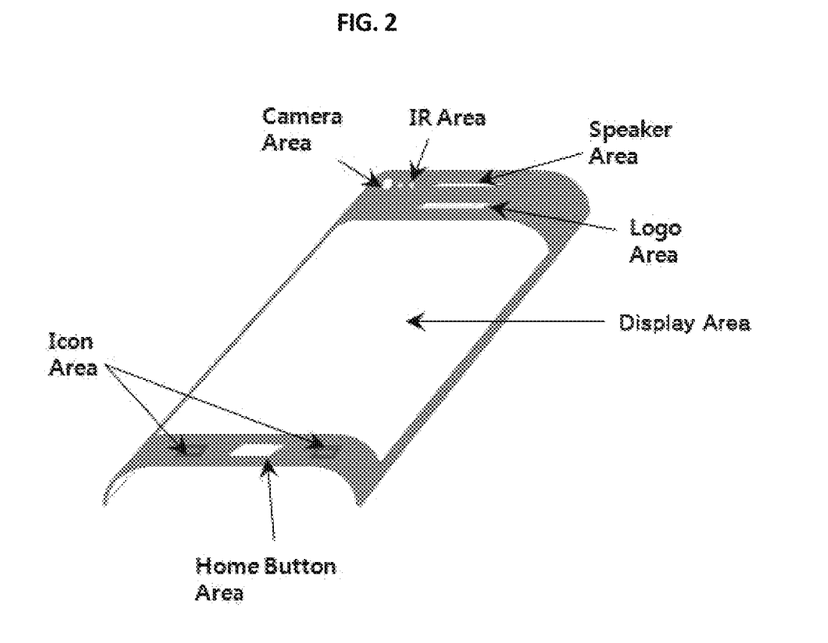
FIG. 2 is a view schematically illustrating a cover window plate according to an embodiment of the present invention.

FIG. 2 is a view schematically illustrating a cover window plate according to an embodiment of the present invention;

A position in which the curved part according to the present invention is formed is not particularly limited. For example, as illustrated in FIG. 2, the curved part may be formed at both end portions of the plate in a short side direction thereof. In addition, the conductive pattern layer may be formed at one end portion of the plate in a long side direction thereof, or at one end portion of plate in the short side direction thereof, and at both end portions of the plate in the long and short side directions thereof according to the shape required by the product.

Figure 3:
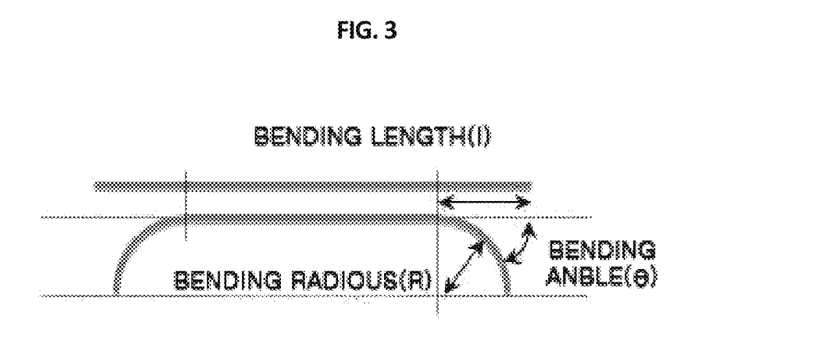
FIG. 3 is a view illustrating a reference for measuring a shape of a curved part in the present invention.

FIG. 3 is a view illustrating a reference for measuring a shape of the curved part according to the present invention.

The shape of the curved part according to the present invention is not particularly limited. As illustrated in FIG. 3, the curved part may be formed in a predetermined length so as to have a predetermined radius of curvature of 5 mm to 15 mm, for example. When the curved part has a radius of curvature within the above range, it is determined that the curved part may exhibit the same level of properties as the flat portion of the plate, and thus being more appropriate in this aspect.

The cover window plate of the present invention is provided with the above-described organic-inorganic hybrid hard coating layer, such that it is possible to achieve excellent durability and optical characteristics throughout the plate regardless of the shape of the curved part.

<Method of Manufacturing a Cover Window Plate>

Further, the present invention provides a method of manufacturing the above-described cover window plate.

Hereinafter, a method of manufacturing a cover window plate according to an embodiment of the present invention will be described in detail.

The method of manufacturing a cover window plate according to an embodiment of the present invention includes a step S1 of forming an organic-inorganic hybrid hard coating layer by applying a composition for forming an organic-inorganic hybrid coating layer including an inorganic compound to at least one surface of a polymer substrate film.

The composition for forming an organic-inorganic hybrid coating layer may equally use the composition having above-described ingredients and contents.

An application method of a coating layer is not particularly limited, and may be executed by any method known in the related art, for example, die coater, air knife, reverse roll, spray, blade, casting, gravure, spin coating, and the like.

After the application process, a curing process is further executed. A method of curing the coated layer is not particularly limited, and may be performed by processes of photo-curing or thermal curing along, or photo-curing then thermal curing, and/or thermal curing then photo-curing.

When performing the process of thermal curing then photo-curing as the curing process, the thermal curing is executed at 60 to 90° C. for 60 seconds to 300 seconds, and the photo-curing is executed by controlling a curing time so that light in a region of 320 to 400 nm has a light amount of 400 to 700 mJ/cm$^2$.

In the present invention, a method of forming a polymer substrate film used in the step S1 is not particularly limited, but may include a process of extruding the above-described polymer material under a specific temperature and pressure conditions.

More particularly, the extrusion process may be executed by melting the polymer material at a temperature of melting point or more thereof, then discharging the molten material through an extrusion die under a predetermined pressure. When forming a plate-shaped polymer substrate film as the substrate film of the present invention, the extrusion process may be executed by winding the protruded polymer material while stretching the same with a tension of a predetermined magnitude or more.

Meanwhile, the polymer is rapidly cooled during the stretching process. In this process, a residual stress is generated in the film, as well as, a difference in surface roughness, density of tissue, and the like occurs due to a difference in temperatures between the front surface contacting with an air layer and a rear surface contacting with a transfer means during winding.

As such, when the residual stress is present in the film, a phenomenon such as deflection due to warpage, contraction and expansion may occur during additional thermal processing, and an additional laminate formed thereon may be easily peeled-off.

To solve the above-described problems, in the present invention, the polymer substrate film used in the step S1 may be subjected to an additional heat treatment (step S1-1) before the step S1.

More particularly, in the step S1-1, the polymer substrate film may be heat treated under a condition of a heat distortion temperature (HDT)±20° C. or a glass transition temperature (Tg)±20° C. of a polymer. In this case, by mitigating the residual stress generated during manufacturing processes, a reduction in durability occurred during the additional thermal process may be compensated. In the present invention, the expression of ±20° C. is a concept including −20° C. to +20° C. of a temperature (the heat distortion temperature (HDT) or glass transition temperature (Tg) of the polymer) which becomes the corresponding reference point.

In addition, the heat treatment process of the polymer substrate film may be executed at 90° C. to 110° C. for 60 minutes to 240 minutes. When executing the heat treatment in the above condition, the residual stress may be effectively mitigated.

The polymer substrate film according to the present invention may be subjected to a step S1-2 of cooling the film at 25° C. to 60° C. for 1 minute to 15 minutes after the heat treatment step S1-1. In this case, effects of removing the residual stress may be further improved.

In addition, the polymer substrate film according to the present invention may be further subjected to a step S1-3 of cooling the film at a lower temperature than the cooling temperature of the step S1-2 after the step S1-2. In this case, the above-described effects may be further improved.

The cover window plate of the present invention is formed so as to satisfy the above-described shape and properties according to the above method, such that it is possible to significantly reduce an occurrence of deflection, and achieve excellent durability and optical characteristics by being applied to the products having different shapes.

If necessary, the method of forming a cover window plate of the present invention may further include a step S2 of forming a curved part by heat treating a portion separated from at least one end portion of the substrate film at a predetermined interval while applying a pressure to the end portion so as to be bent in a direction in which the end portion is pressed, after forming the organic-inorganic hybrid hard coating layer.

More particularly, the step S2 of forming the curved part simultaneously executes the heat treating and pressing processes on a predetermined position to be formed the curved part. By the heat treatment performed at a predetermined temperature, the polymer materials in the plate may be flexed and deformed, and in this state, the plate may be bent in a predetermined direction due to the pressure applied during the pressing process, thereby executing the curved part forming process.

A direction of the curved part is appropriately controlled depending on the direction in which the end portion is pressed, such that the curved part may be formed in the direction required by the product, and may also be formed at a position by heat treating and pressing a portion required by the product.

In the step S2 of the present invention, the heat treatment may be performed by hot air jetting. A temperature of executing the heat treatment is not particularly limited, but may be properly selected and used according to the material of the used plate. In particular, the heat treatment may be executed, for example, at 100° C. to 350° C. When executing the heat treatment within the above range, it is determined that the curved part may be easily formed within a melting temperature range of the material (ingredients included in the polymer substrate film and the hard coating layer) of the plate according to the present invention.

Figure 4:
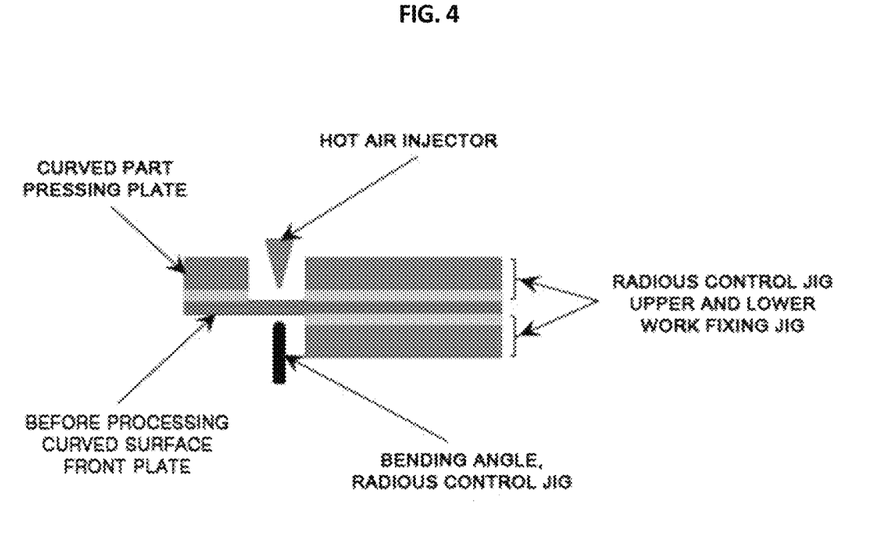
FIG. 4 is a view schematically illustrating an apparatus used in a process of forming the curved part of the cover window plate according to the embodiment of the present invention.

FIG. 4 is a view schematically illustrating an apparatus used in the step S2 of forming the curved part according to the embodiment of the present invention.

Referring to FIG. 4, the step S2 of forming the curved part according to the present invention may simultaneously perform the heat treating and pressing processes in a specific apparatus.

More particularly, the step S2 of forming the curved part may be performed by an apparatus which includes: a curvature forming unit disposed on a surface of the substrate film opposite to the surface at a point to which the hot air is jetted to support the cover window plate; a pressing unit disposed on one surface of the end portion of the substrate film to press the same; and a fixing unit disposed on a side of substrate film opposite to the end portion based on the point to which the hot air is jetted to fix the other end portion of the substrate film.

The curvature forming unit according to the present invention may be properly disposed to achieve a shape required by the product, and a point in which the curvature forming unit is disposed and the point to which the hot air is jetted may be disposed so as to face each other toward the same portion of the plate.

The pressing unit according to the present invention may be properly disposed on the end portion of the plate so as to press the same in the predetermined direction. Preferably, the pressing unit may be disposed at the end portion on the same side as the point to which the hot air is jetted.

The fixing unit according to the present invention may be disposed on the side of substrate film opposite to the end portion based on the point to which the hot air is jetted to fix a portion of the plate in which the curved part is not formed. By the fixing unit, influence due to the heat treating and processing processes on the flat portion of the plate except for the curved part may be decreased.

As described above, the method of forming a cover window plate according to the present invention is executed by first forming the hard coating layer on the polymer substrate film (step S1), then by forming the curved part by the heat treating and pressing (step S2), such that it is possible to effectively suppress a decrease in hardness of the plate, and achieve the same optical characteristics even in the curved part as the flat part of the plate.

When first executing the step S2 and executing the step S1, hardness of the plate may be decreased due to uniform hard coating, and a retardation problem due to a deviation in thickness of the curved part and cracks in the hard coating layer may occur. In addition, the durability and optical characteristics of the curved part of the plate may be slightly deteriorated compared to the flat part of the plate.

<Image Display Device>

Further, the present invention provides an image display device including the above-described cover window plate. The image display device of the present invention may further include the configurations known in the related art other than the above-described configurations.

Hereinafter, preferred embodiments will be described to more concretely understand the present invention with reference to the drawings. However, those skilled in the art will appreciate that such embodiments are provided for illustrative purposes and do not limit subject matters to be protected as disclosed in the detailed description and appended claims. Therefore, it will be apparent to those skilled in the art various alterations and deformations of the embodiments are possible within the scope and spirit of the present invention and duly included within the range as defined by the appended claims.

EXAMPLES AND COMPARATIVE EXAMPLES

Example 1

<Preparation of Polymer Substrate Film>

A polymer substrate film A-1 was prepared through step-by-step heat treatment of heating a polymethyl methacrylate film at 100° C. for 120 minutes, cooling the film at 60° C. for 10 minutes, and further cooling the film at room temperature (25° C.).

<Preparation of Cover Window Plate>

Hard coating layers having a final thickness of 30 μm were formed by applying compositions for forming an organic-inorganic hybrid coating layer having ingredients and compositions described in Table 1 below to one surface of the heat treated polymer substrate film, followed by drying the same at 90° C. for 90 seconds and irradiating the coated surface with light at an UV wavelength of 315 to 365 nm in a light amount of 600 mJ/cm$^2$ to cure the same.

Next, non-display part shielding layers were formed on a surface of the polymer substrate film opposite to the surface on which the hard coating layers are formed, followed by drying the same at 80° C. for 60 minutes.

Thereafter, a PET substrate film having a peeling-off strength of 80 N/25 mm and a contraction rate of 60 ppm in a condition of 60° C. and 90% RH was adhered to a front of the polymer substrate film (at a side on which the hard coating layer is formed) using an acryl adhesive, and a PET substrate film having a peeling-off strength of 200 N/25 mm and a contraction rate of 150 ppm in a condition of 60° C. and 90% RH was adhered to a rear of the polymer substrate film (at a side on which the non-display part shielding layer is formed) using the acryl adhesive.

After adhering, the polymer substrate film with the PET substrate films was cut in a cell unit having a predetermined size by using a $CO_2$ laser of 400 W at a moving speed of 100 mm/sec to prepare a cover window plate.

Example 2

The same procedures as described in Example 1 were conducted to prepare a cover window plate except that the hard coating layer was formed in a thickness of 20 μm.

Example 3

The same procedures as described in Example 1 were conducted to prepare a cover window plate except that the hard coating layer was formed in a thickness of 10 μm.

Example 4

The same procedures as described in Example 1 were conducted to prepare a cover window plate except that a polymer substrate film A-2 heat treated at 80° C. was used.

Example 5

The same procedures as described in Example 1 were conducted to prepare a cover window plate except that a polymer substrate film A-3 heat treated at 110° C. was used.

Example 6

The same procedures as described in Example 1 were conducted to prepare a cover window plate except for using a polymer substrate film A-4 in which heat treatment was not executed.

Examples 7 to 14 and Comparative Examples 1 to 3

The same procedures as described in Example 1 were conducted to prepare cover window plates except that compositions for forming an organic-inorganic hybrid coating layer having ingredients and compositions described in Table 1 below were used when preparing the hard coating layers.

Example 15

<Formation of Curved Part>

Other portions of the cover window plate prepared in Example 1 except for a point of 100 mm from an end portion in a short side direction thereof were fixed by a fixing unit. Then, hot air injectors were disposed at a side of the plate on which the hard coating layer is formed based on a point of 90 mm from the end portion of the plate, and a curvature forming unit was disposed at a side of the plate on which the non-display part shielding layer is formed. In this case, the hot air injectors were disposed at an interval of 100 mm form the plate, and a pressing unit was disposed on one surface of the end portion of the plate on which the hard coating layer is formed.

Thereafter, the end portion of the plate was pressed by the pressing unit at 50 kPa and 15 mm/sec, and at the same time, hot air was jetted at a temperature of 250° C. to form a curved part. The formed curved part has a radius of curvature of 10 mm.

Example 16

The same procedures as described in Example 15 were conducted to prepare a cover window plate except that the hard coating layer was formed in a thickness of 20 μm.

Example 17

The same procedures as described in Example 15 were conducted to prepare a cover window plate except that the hard coating layer was formed in a thickness of 10 μm.

Example 18

The same procedures as described in Example 15 were conducted to prepare a cover window plate except that a polymer substrate film A-2 heat treated at 80° C. was used.

Example 19

The same procedures as described in Example 15 were conducted to prepare a cover window plate except that a polymer substrate film A-3 heat treated at 110° C. was used.

Example 20

The same procedures as described in Example 15 were conducted to prepare a cover window plate except for using a polymer substrate film A-4 in which heat treatment was not executed.

Example 21

The same procedures as described in Example 15 were conducted to prepare a cover window plate except that a curved part was first formed in the heat treated polymer substrate film, then a hard coating layer was formed thereon.

Examples 22 to 29 and Comparative Examples 4 to 6

The same procedures as described in Example 15 were conducted to prepare cover window plates except that compositions for forming an organic-inorganic hybrid coating layer having ingredients and compositions described in Table 1 below were used when preparing the hard coating layers.

TABLE 1

| Section | Surface hardness | Substrate film (A) | Thickness of hard coating layer (μm) | Inorganic compound (B/wt. %) | Polymerizable compound (C/wt. %) | Polymerization initiator (D/wt. %) | Solvent (E/wt. %) |
|---|---|---|---|---|---|---|---|
| Example 1 | 9H | A-1 | 30 | B-1/34 | C-1/16 | D-1/6 | E-1/Balance |
| Example 2 | 7H | A-1 | 20 | B-1/34 | C-1/16 | D-1/6 | E-1/Balance |
| Example 3 | 5H | A-1 | 10 | B-1/34 | C-1/16 | D-1/6 | E-1/Balance |
| Example 4 | 9H | A-2 | 30 | B-1/34 | C-1/16 | D-1/6 | E-1/Balance |
| Example 5 | 9H | A-3 | 30 | B-1/34 | C-1/16 | D-1/6 | E-1/Balance |
| Example 6 | 9H | A-4 | 30 | B-1/34 | C-1/16 | D-1/6 | E-1/Balance |
| Example 7 | 7H | A-1 | 30 | B-1/28 | C-1/22 | D-1/6 | E-1/Balance |
| Example 8 | 9H | A-1 | 30 | B-1/36 | C-1/14 | D-1/6 | E-1/Balance |
| Example 9 | 6H | A-1 | 30 | B-1/19.5 | C-1/30.5 | D-1/6 | E-1/Balance |
| Example 10 | 9H | A-1 | 30 | B-1/37.5 | C-1/12.5 | D-1/6 | E-1/Balance |
| Example 11 | 9H | A-1 | 30 | B-2/34 | C-1/16 | D-1/6 | E-1/Balance |
| Example 12 | 9H | A-1 | 30 | B-3/34 | C-1/16 | D-1/6 | E-1/Balance |
| Example 13 | 9H | A-1 | 30 | B-1/34 | C-1/17.5 | D-1/6 | E-1/Balance |
| Example 14 | 9H | A-1 | 30 | B-1/34 | C-1/18 | D-1/6 | E-1/Balance |
| Example 15 | 9H | A-1 | 30 | B-1/34 | C-1/16 | D-1/6 | E-1/Balance |
| Example 16 | 7H | A-1 | 20 | B-1/34 | C-1/16 | D-1/6 | E-1/Balance |
| Example 17 | 5H | A-1 | 10 | B-1/34 | C-1/16 | D-1/6 | E-1/Balance |
| Example 18 | 9H | A-2 | 30 | B-1/34 | C-1/16 | D-1/6 | E-1/Balance |
| Example 19 | 9H | A-3 | 30 | B-1/34 | C-1/16 | D-1/6 | E-1/Balance |
| Example 20 | 9H | A-4 | 30 | B-1/34 | C-1/16 | D-1/6 | E-1/Balance |
| Example 21 | 7H | A-1 | 30 | B-1/28 | C-1/22 | D-1/6 | E-1/Balance |
| Example 22 | 9H | A-1 | 30 | B-1/36 | C-1/14 | D-1/6 | E-1/Balance |
| Example 23 | 6H | A-1 | 30 | B-1/19.5 | C-1/30.5 | D-1/6 | E-1/Balance |
| Example 24 | 9H | A-1 | 30 | B-1/37.5 | C-1/12.5 | D-1/6 | E-1/Balance |
| Example 25 | 9H | A-1 | 30 | B-2/34 | C-1/16 | D-1/6 | E-1/Balance |
| Example 26 | 9H | A-1 | 30 | B-3/34 | C-1/16 | D-1/6 | E-1/Balance |
| Example 27 | 9H | A-1 | 30 | B-1/34 | C-1/17.5 | D-1/6 | E-1/Balance |
| Example 28 | 9H | A-1 | 30 | B-1/34 | C-1/18 | D-1/6 | E-1/Balance |

TABLE 1-continued

| Section | Surface hardness | Sub-strate film (A) | Thickness of hard coating layer (μm) | Inorganic compound (B/wt. %) | Polymerizable compound (C/wt. %) | Polymerization initiator (D/wt. %) | Solvent (E/wt. %) |
|---|---|---|---|---|---|---|---|
| Example 29 | 9H | A-1 | 30 | B-1/34 | C-1/16 | D-1/6 | E-1/Balance |
| Comparative Example 1 | 3H | A-1 | 30 | B-1/18 | C-1/32 | D-1/6 | E-1/Balance |
| Comparative Example 2 | 3H | A-1 | 30 | B-1/16 | C-1/34 | D-1/6 | E-1/Balance |
| Comparative Example 3 | 3H | A-1 | 30 | B-1/14 | C-1/36 | D-1/6 | E-1/Balance |
| Comparative Example 4 | 3H | A-1 | 30 | B-1/18 | C-1/32 | D-1/6 | E-1/Balance |
| Comparative Example 5 | 3H | A-1 | 30 | B-1/16 | C-1/34 | D-1/6 | E-1/Balance |
| Comparative Example 6 | 3H | A-1 | 30 | B-1/14 | C-1/36 | D-1/6 | E-1/Balance |

A: polymer substrate film
A-1: polymethyl(meth)acrylate film heat treated at 100° C.
A-2: polymethyl(meth)acrylate film heat treated at 80° C.
A-3: polymethyl(meth)acrylate film heat treated at 110° C.
A-4: polymethyl(meth)acrylate film without executing separate heat treatment
B: inorganic compound
B-1: nano-silica sol:vinyltrimethoxysilane (in a weight ratio of 67:23)
B-2: nano-silica sol:bis(triethoxysilylpropyl)tetrasulfide (in a weight ratio of 67:23)
B-3: nano-silica sol:N-(3-acryloxy-2-hydroxypropyl)-3- aminopropyltrimethoxysilane (in a weight ratio of 67:23)
C: Polymerizable compound
C-1: hydroxyethyl (meth)acrylate:perfluoroalkyl acrylate (in a weight ratio of 94:6)
D: polymerization initiator
D-1: Igracure 184:Igracure 2959 (in a weight ratio of 50:50)
E: solvent E-1: PGMEA
In a case of the surface hardness, pencil hardness for the hard coating layer was measured using a pencil manufactured by Mitsubishi Co. under a load of 1 kg according to JIS5400.

Test Procedure (1) Evaluation of an Occurrence of Deflection (Deflected Amount)

After leaving the cover window plates prepared according to the examples and comparative examples at 60° C. and 90% RH for hours, the plates were placed so that the hard coating layers face a top, and a maximum height among portions that are not adhered to a bottom surface and lifted up therefrom was respectively measured at room temperature (25° C.) (see FIG. 1). Results thereof are described in Table 2 below.

A case in which the cover window plate has a plus (+) deflected amount means that the plate is bent toward the hard coating layer (normal curls), and a case in which the cover window plate has a minus (−) deflected amount means that the plate is bent toward the non-display part shielding layer (reverse curls).

(2) Evaluation of Anti-Fingerprint Property

After dropping water drops on surfaces of the cover window plates prepared according to the examples and comparative examples, an angle (water contact angle) formed by the surface and the water drop was respectively measured. Results thereof are described in Table 2 below.

When the angle is within a range of 100° to 120°, excellent anti-fingerprint properties may be achieved, and most preferably, the best anti-fingerprint properties were obtained when the angle is 110° to 120°.

(3) Evaluation of Impact Resistance

After fixing the cover window plates prepared according to the examples and comparative examples on a jig having a hole of 50 mm penetrated in a center thereof, a steel ball of 130 g was dropped at a predetermined height to respectively measure a maximum height in which distortion, breakage, or the like occurs on an appearance. Results thereof are described in Table 2 below.

(4) Evaluation of Durability (Curved Part and Flat Part)

The curved parts and flat parts of the cover window plates prepared according to the examples and comparative examples was visually observed to confirm whether scratches, cracks, or distortions occurred thereon using a 3 band radiation lamp, respectively, and cutting planes was observed by enlarging using an optical microscope, then a length of a long side of a yellow zone in the cutting plane was measured. Results thereof are described in Table 2 below.

When the length of the long side of a yellow zone in the cutting plane is less than 80 μm, visibility of edge portions of the plate is excellent, while if the length thereof exceeds 80 μm, a problem in which the yellow zone is viewed may occur.

(5) Evaluation of Optical Characteristics (Curved Part and Flat Part)

Haze and chromaticity (color (b*)) were measured on the curved parts and flat parts of the cover window plate prepared according to Examples 15 to 29 and Comparative Examples 4 to 6 using JIS K7361-1, respectively. Results thereof are described in Table 2 below.

TABLE 2

| Section | Deflected amount | Anti-fingerprint property | Impact resistance | Adhesion | Occurrence of Crack Curved part | Occurrence of Crack Flat part | Optical characteristic (Haze/Color (b*)) Curved part | Optical characteristic (Haze/Color (b*)) Flat part |
|---|---|---|---|---|---|---|---|---|
| Example 1 | +0.5 | 110° | 25 cm | 100/100 | No | No | — | — |
| Example 2 | +0.5 | 110° | 25 cm | 100/100 | No | No | — | — |
| Example 3 | +0.5 | 110° | 24 cm | 100/100 | No | No | — | — |
| Example 4 | +0.7 | 110° | 25 cm | 100/100 | No | No | — | — |
| Example 5 | +0.4 | 110° | 25 cm | 100/100 | No | No | — | — |
| Example 6 | +1.0 | 110° | 25 cm | 100/100 | No | No | — | — |
| Example 7 | +0.7 | 110° | 25 cm | 100/100 | No | No | — | — |
| Example 8 | −0.2 | 110° | 25 cm | 90/100 | No | No | — | — |
| Example 9 | +1.2 | 110° | 25 cm | 100/100 | No | No | — | — |
| Example 10 | −0.5 | 110° | 25 cm | 80/100 | No | No | — | — |
| Example 11 | +0.8 | 110° | 25 cm | 70/100 | No | No | — | — |
| Example 12 | +0.9 | 110° | 25 cm | 60/100 | No | No | — | — |
| Example 13 | +0.5 | 112° | 25 cm | 100/100 | No | No | — | — |
| Example 14 | +0.5 | 115° | 25 cm | 100/100 | No | No | — | — |
| Example 15 | +0.5 | 110° | 25 cm | 100/100 | No | No | 1.0/0.97 | 1.0/0.97 |
| Example 16 | +0.5 | 110° | 25 cm | 100/100 | No | No | 0.8/0.73 | 0.8/0.73 |
| Example 17 | +0.5 | 110° | 24 cm | 100/100 | No | No | 0.6/0.64 | 0.6/0.64 |
| Example 18 | +0.7 | 110° | 25 cm | 100/100 | No | No | 1.0/0.97 | 1.0/0.97 |
| Example 19 | +0.4 | 110° | 25 cm | 100/100 | No | No | 1.2/1.1 | 1.2/0.99 |
| Example 20 | +1.0 | 110° | 25 cm | 100/100 | No | No | 1.0/0.97 | 1.0/0.97 |
| Example 21 | +0.7 | 110° | 25 cm | 100/100 | No | No | 1.0/0.97 | 1.0/0.97 |
| Example 22 | −0.2 | 110° | 25 cm | 90/100 | No | No | 1.0/0.97 | 1.0/0.97 |
| Example 23 | +1.2 | 110° | 25 cm | 100/100 | No | No | 1.0/0.97 | 1.0/0.97 |
| Example 24 | −0.5 | 110° | 25 cm | 80/100 | No | No | 1.0/0.97 | 1.0/0.97 |
| Example 25 | +0.8 | 110° | 25 cm | 70/100 | No | No | 3.6/1.1 | 3.4/1.1 |
| Example 26 | +0.9 | 110° | 25 cm | 60/100 | No | No | 4.2/1.0 | 4.2/1.3 |
| Example 27 | +0.5 | 112° | 25 cm | 100/100 | No | No | 1.0/0.97 | 1.0/0.97 |
| Example 28 | +0.5 | 115° | 25 cm | 100/100 | No | No | 1.0/0.97 | 1.0/0.97 |
| Example 29 | +0.5 | 110° | 25 cm | 100/100 | Yes | No | 1.0/0.97 | 1.0/0.97 |
| Comparative Example 1 | +1.5 | 110° | 22 cm | 100/100 | No | No | — | — |
| Comparative Example 2 | +1.7 | 110° | 22 cm | 100/100 | No | No | — | — |
| Comparative Example 3 | +2.1 | 110° | 22 cm | 100/100 | No | No | — | — |
| Comparative Example 4 | +1.5 | 110° | 22 cm | 100/100 | No | No | 0.9/0.88 | 0.9/0.88 |
| Comparative Example 5 | +1.7 | 110° | 22 cm | 100/100 | No | No | 0.6/0.82 | 0.6/0.82 |
| Comparative Example 6 | +2.1 | 110° | 22 cm | 100/100 | No | No | 0.5/0.80 | 0.5/0.80 |

As understood in Table 2, it can be confirmed that all the cover window plates of the examples including the hard coating layer according to the present invention have hardness of 4H or more and a deflected amount of +1.2 mm or less, thereby capable of being manufactured as products.

However, it can be seen that the cover window plates of Examples 4 and 18 having a slightly low heat treatment temperature of the polymer substrate film have a slightly increased deflected amount, respectively, and the cover window plates of Example 19 having a slightly high heat treatment temperature have a slightly increased Haze, respectively, as well as, in a case of the cover window plates of Examples 6 and 20 using the polymer substrate film in which heat treatment is not executed, an occurrence of deflection due to the residual stress is increased compared to the other examples.

On the other hand, it can be seen that the cover window plates of Comparative Examples 1 and 6 having hardness values out of the range according to the present invention have significantly increased deflected amount, respectively. In particular, it can be seen that, with a content of inorganic compound compared to the polymerizable compound is decreased (Comparative Example 1=Comparative Example 4<Comparative Example 2=Comparative Example 5<Comparative Example 3=Comparative Example 6), the deflected amount is further increased.

What is claimed is:

1. A cover window plate comprising:
   a polymer substrate film;
   an organic-inorganic hybrid hard coating layer on at least one surface of the polymer substrate film,
   wherein the plate has a pencil hardness of 4H or more under a load of 1 kg,
   wherein the plate has a deflected amount of −1.0 mm (reverse curls) to +1.0 mm (normal curls), which is measured at room temperature (25° C.) with being placed so that the hard coating layer faces a top, after leaving the plate at 60° C. and 90% RH.

2. The cover window plate according to claim 1, wherein the pencil hardness is 6H or more under a load of 1 kg.

3. The cover window plate according to claim 1, wherein the hard coating layer includes at least one inorganic compound selected from a group consisting of nano-silica, vinyltrimethoxysilane, vinyltriethoxysilane, glycidoxypropylmethyldimethoxysilane, epoxycyclohexylethyltrimethoxysilane, glycidoxypropyltrimethoxysilane, glycidoxypropyltriethoxysilane, methacryloxypropyltrimethoxysilane, methacryloxypropyltriethoxysilane.

4. The cover window plate according to claim 3, wherein the hard coating layer is made of a composition comprising the at least one inorganic compound, a polymerizable compound, a polymerization initiator, and a solvent.

5. The cover window plate according to claim 4, wherein the at least one inorganic compound is included in an amount of 100 to 260 parts by weight to 100 parts by weight of the polymerizable compound.

6. The cover window plate according to claim 4, wherein the polymerizable compound is at least one selected from a group consisting of perfluoroalkyl acrylate, hydroxyethyl (meth)acrylate, hexanediol diacrylate, trimethylolpropane tri(meth)acrylate, pentaerythritol tri(meth)acrylate, ethyleneglycol di(meth)acrylate, 1,6-hexanediol di(meth)acrylate, tripropyleneglycol diacrylate, trimethylolpropane trioxyethyl(meth)acrylate, tricyclodecane dimethanol diacrylate, and dipentaerythritol hexa(meth)acrylate.

7. The cover window plate according to claim 1, wherein the hard coating layer has a water contact angle of 80° to 120°.

8. The cover window plate according to claim 1, wherein the hard coating layer has a thickness of 10 to 40 μm.

9. The cover window plate according to claim 1, wherein the polymer substrate film is heat treated under a condition of a heat distortion temperature (HDT)±20° C. or a glass transition temperature (Tg)±20° C. of a polymer.

10. The cover window plate according to claim 1, wherein the polymer substrate film is heat treated at 90° C. to 110° C. for 120 minutes to 240 minutes.

11. The cover window plate according to claim 10, wherein the polymer substrate film is cooled at 25° C. to 60° C. for 1 minute to 15 minutes after heat treating.

12. The cover window plate according to claim 11, wherein the polymer substrate film is further cooled at a lower temperature than the temperature of the cooling process after cooling.

13. The cover window plate according to claim 1, wherein the polymer substrate film includes at least one selected from a group consisting of polymethyl (meth)acrylate (PMMA), polycarbonate (PC), polyethylene terephthalate (PET), polyimide (PI), polyamide (PA), cycloolefin polymer (COP), cycloolefin copolymer (COC), PMMA/PC copolymer, and PMMA/PC/PMMA copolymer.

14. The cover window plate according to claim 1, wherein the polymer substrate film has a thickness of 0.2 to 1.0 mm.

15. The cover window plate according to claim 1, further comprising a non-display part shielding layer on a surface of the polymer substrate film opposite to the surface on which the hard coating layer is formed.

16. The cover window plate according to claim 15, further comprising protective films respectively formed on both surfaces of the cover window plate.

17. The cover window plate according to claim 16, wherein the protective film on a front surface of the cover window plate has a contraction rate of 100 ppm or less, and the protective film on a rear surface of the cover window plate has a contraction rate of 100 ppm or more under a condition of 60° C. and 90% RH.

18. The cover window plate according to claim 16, wherein the protective film on a front surface of the cover window plate has a contraction rate of 100 ppm or less, and the protective film on a rear surface of the cover window plate has a contraction rate of 100 ppm or more under a condition of 85° C. and 85% RH.

19. The cover window plate according to claim 1, wherein the plate has a deflected amount of −1.0 mm (reverse curls) to +1.0 mm (normal curls), which is measured at room temperature (25° C.) with being placed so that the hard coating layer faces a top, after leaving the plate at 85° C. and 85% RH.

20. The cover window plate according to claim 1, comprising a curved part at at least one end portion of the cover window plate.

21. The cover window plate according to claim 20, wherein the curved part has a radius of curvature of 5 mm to 15 mm.

22. An image display device comprising the cover window plate of claim 1.

23. A method of manufacturing a cover window plate, comprising:
heat-treating a polymer substrate film under a condition of a heat distortion temperature (HDT)±20° C. or a glass transition temperature (Tg)±20° C. of a polymer, before the formation of the organic-inorganic hybrid hard coating layer; and
forming an organic-inorganic hybrid hard coating layer by applying a composition including an inorganic compound to at least one surface of the polymer substrate film after the heat-treating the polymer substrate film.

24. The method according to claim 23, wherein the polymer substrate film is subjected to a heat treatment step at 90° C. to 110° C. for 120 minutes to 240 minutes.

25. The method according to claim 24, wherein the polymer substrate film is subjected to a first cooling step at 25° C. to 60° C. for 1 minute to 15 minutes after the heat treatment step S1-1.

26. The method according to claim 25, wherein the polymer substrate film is further subjected to a second cooling step at a lower temperature than the cooling temperature of the first cooling step after the first cooling step.

27. The method according to claim 23, further comprising forming a curved part by heat treating a portion separated from at least one end portion of the substrate film at a predetermined interval while applying a pressure to the end portion so as to be bent in a direction in which the end portion is pressed, after forming the organic-inorganic hybrid hard coating layer.

28. The method according to claim 27, wherein the heat-treating for forming the curved part is executed by hot air jetting.

29. The method according to claim 27, wherein heat-treating for forming the curved part is executed at 100° C. to 350° C.

30. The method according to claim 27, wherein the forming of the curved part is performed by an apparatus which includes:
a curvature forming unit disposed on a surface of the substrate film opposite to the surface at a point to which the hot air is jetted to support the cover window plate;
a pressing unit disposed on one surface of the end portion of the substrate film to press the same; and
a fixing unit disposed on a side of substrate film opposite to the end portion based on the point to which the hot air is jetted to fix the other end portion of the substrate film.

* * * * *